Dec. 16, 1969     W. B. GOGARTY     3,483,732
CONTINUOUS DENSITY-DETERMINING DEVICE AND PROCESS
Filed March 18, 1968     2 Sheets-Sheet 1
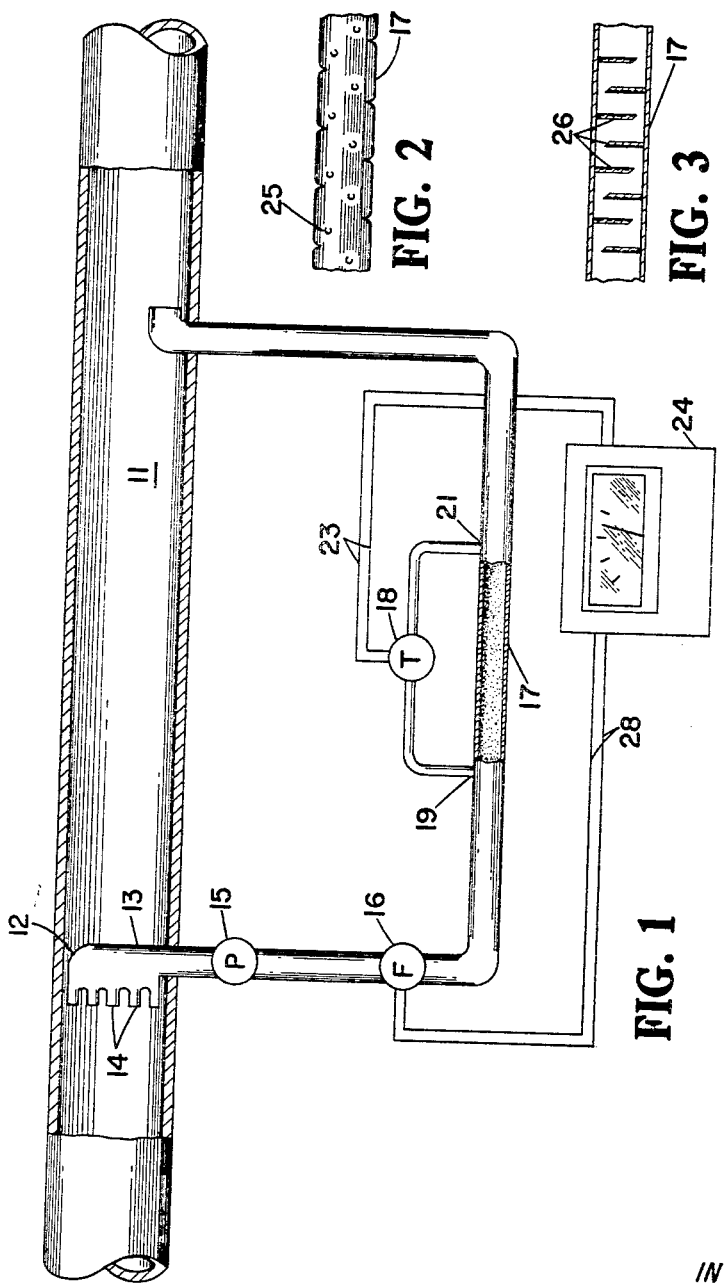
INVENTOR
WILLIAM B. GOGARTY
BY
ATTORNEY

United States Patent Office 3,483,732
Patented Dec. 16, 1969

---

3,483,732
CONTINUOUS DENSITY-DETERMINING DEVICE AND PROCESS
William B. Gogarty, Littleton, Colo., assignor to Marathon Oil Company, Findlay, Ohio, a corporation of Ohio
Continuation-in-part of application Ser. No. 445,165, Apr. 2, 1965. This application Mar. 18, 1968, Ser. No. 713,668
Int. Cl. G01n 9/00
U.S. Cl. 73—32
10 Claims

ABSTRACT OF THE DISCLOSURE

The present invention comprises apparatus and methods for determining the density of a liquid comprising passing the liquid in completely turbulent flow through a confined zone extending a distance along the direction of liquid flow and measuring the pressure drop across the zone or a portion thereof.

---

This application is a continuation-in-part of my co-pending United States patent application Ser. No. 445,165, filed Apr. 2, 1965, now abandoned.

Dynamic densitometers are generally quite complex and often give only periodic readout. While periodic readout is adequate for many usages, there are others for which such readout is insufficient. For example, in refinery operations, liquid density can be used to control the temperature of distillation columns, solvent extraction operations, etc. In all of these operations, optimum operation is achieved through instantaneous and continuous control.

Pipeline operations are another area where excellent control is required. For example, if gasoline is pumped tthrough a conduit ahead of a heavy fuel oil, it is imperative that both the gasoline and the fuel oil be uncontaminated when stored and used. For example, substantial gasoline in a fuel oil could result in an explosion with consequent loss of life, property damage, and the like. Lease auto-matic custody transfer units require continuous density recordings to effect accurate production records, payments, etc.

The device and metthod of this invention provide a simple density determination which finds particular usage in production, refinery, and pipeline operations. The process of this invention is accomplished by passing a liquid, in complete turbulent flow, through a confined zone and measuring the volume throughput and pressure drop of the liquid. These measurements can be converted to electrical impulses; and the impulses used to control valves, temperature controls, and the like.

The devices of my invention are a combination of a confined zone, a means for rendering the flowing liquid within the line turbulent, a liquid flow measuring device, and a detector of differences between the pressure of the introduced liquid and that of the liquid exciting the confined zone.

The process of this invention is based on a recognition that in a region of completely turbulent flow, the pressure drop across a confined zone, for a given flow rate, depends only on the density of the flowing liquid. The linear dependency of pressure drop with density occurs because for incompressible liquids the friction factor is independent of the Reynolds number in areas of complete turbulence. Sensitivity of the equipment is, therefore, a function of the degree of pressure drop across the confined zone. Thus, increasing pipe length for a given pipe diameter, decreasing diameter for a given length, etc., effect greater sensitivity in the equipment.

U.S. Patent No. 1,530,222 to Weymouth utilizes an orifice in series with a capillary tube and measuring devices to determine the flow rate of the liquid and pressure difference across the orifice and to correlate these measurements to determine the density of the liquid.

The liquid flow equation (or energy balance equation) is well known in the art of fluid flow:

$$\frac{\Delta P}{\rho} + \frac{\Delta(v^2)}{2g_c} + \bar{l}_w = 0 \quad (1)$$

where $\Delta P$ is the pressure differential between two points, $\rho$ is the density of the liquid, $\Delta(v^2)$ is the change in the square of the velocities of the liquid between the two points, $g_c$ is a constant, and $\bar{l}_w$ is the lost work term. In turn, $$\bar{l}_w = \frac{Lfv^2}{2Dg_c}$$

where L is the distance between the two points, D is the diameter of the pipe, and $f$ is the friction factor which is a function of the Reynolds number.

In the case of liquid flow across an orifice (or a venturi tube), the pressure drop term, is essentially proportional to the kinetic energy term; so that the equation can be written:

$$\frac{\Delta P}{\rho} = k_1 \Delta(v^2) = k_1(v_2^2 - v_1^2) \quad (2)$$

where $k_1$ is a constant, $v_2$ is the velocity of the liquid at a point just down stream of the orifice, and $v_1$ is the velocity of the liquid at a point just upstream of the orifice. However, calculation of $v_1$ involves utilizing an equation noted in Unit Operations, Brown, Wiley and Sons, 1950, page 158, which shows that $v_1$ is dependent on the fourth power of the diameter of the orifice. From this it is seen how vital a precision measurement of the diameter of the orifice is in determining the density of the liquid. Because of the inherent high liquid flow rates through orifices and because of such things as the presence of impurities in the form of particulate matter in the liquid, orifices are subject to wear by pitting, rounding of the edges of the orifice, etc., and, hence, a diameter subject to change. Substantial errors may result in density determination unless the orifice (or venturi) is continually maintained or frequently replaced.

As will be apparent from later sections of this application, it is only necessary that the roughened sections of this invention cause complete turbulence and any decrease in the roughness caused by wear or corrosion is not material so long as flow remains completely turbulent.

Thus the above mentioned errors are avoided when the apparatus of the present invention is utilized for determining density of fluids. The flow Equation 1 for liquid flow through a confined zone, such as that created by the combination of the pump and roughened pipe of the present invention, reduces to $$\frac{\Delta P}{\rho} = -\bar{l}_w = -\frac{Lfv^2}{2Dg_c} \quad (3)$$

since the kinetic energy term, unlike the orifice case, is negligible. Now since $$v = \frac{4q}{\pi D^2}$$

where q is the volumetric throughput or flow rate of the fluid, and since for completely turbulent flow, the friction factor is independent of the Reynolds number, the pressure drop term reduces to $$\frac{\Delta P}{\rho} = k_2 q^2 \quad (4)$$

where $k_2$ is a constant.

Solving for the density, $$\rho = k_2' \frac{\Delta P}{q_2} \quad (5)$$

where $k_2'$ is a constant.

Serious error in density determination is incurred using orifices when pulsating flow exists in the line, as discussed more fully on page 160 of the above cited Brown reference. Such error is not encountered when the pump and roughened pipe apparatus of the present invention is utilized.

Another advantage displayed by the apparatus of the present invention is that it is adaptable along any point of a pipeline where liquid is flowing. Thus, instantaneous density determination may be had at any desired location. Furthermore, the apparatus does not substantially inhibit or retard the flow of the liquid in the line like an obstructing orifice does.

The devices and process of this invention are more fully illustrated by reference to the accompanying drawings. Like parts bear like reference numbers in the various figures.

FIGURE 1 is a partly cutaway, partly schematic arrangement for the practice of this invention in a pipeline.

FIGURES 2 and 3 depict turbulence-producing confined zones.

Figure 4:
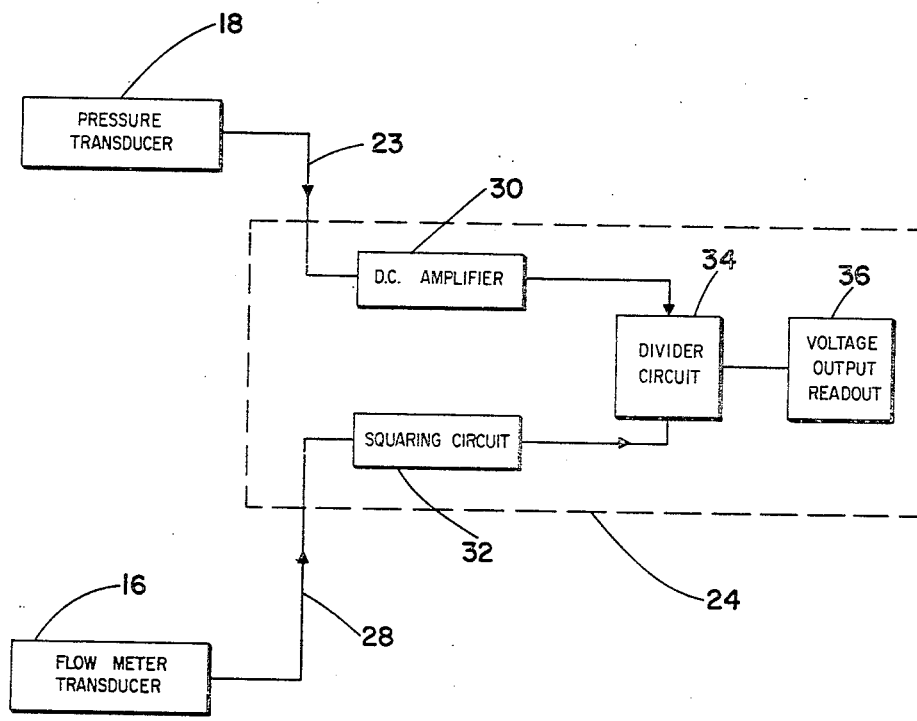
FIGURE 4 shows a block diagram arrangement for determining a density output measurement from the corresponding flow meter and pressure transducer impulse outputs.

A representative sample of the liquid passing through pipeline 11, of FIG. 1, is removed through sampling header 12 and line 13. Header 12 has a number of tubes 14 vertically spaced across pipeline 11. Tubes 14 are preferably largest adjacent the top and bottom of the pipeline and become progressively smaller as they approach the center of the pipeline. The diameter of tubes 14 is adjusted to insure that equal amounts of fluid are introduced into header 12 from each of tubes 14. High-speed pump 15 forces the sample through flowmeter 16 into test section 17. Section 17 is roughened, indicated by stippling, and at a desired flow rate introduces complete turbulence in the fluid passing through confined test section 17. Differential pressure transducer 18 determines pressure drop between points 19 and 21, respectively. Flowmeter 16 and transducer 18 are adapted to emit an electrical output which is a function of the fluid throughput and of the pressure drop across section 17 from points 19 to 21, respectively. On being discharged from section 17, the sample fluid is returned to pipeline 11. The electrical outputs of flowmeter 16 and transducer 18 pass through two wire conductors 22 and 23, respectively, to meter 24 where these outputs are converted to give an electrical density output signal which is converted to mechanical movement for visual readout.

If desired, the density-measuring device of this invention can have an auxiliary liquid circuit, together with necessary valving, designed to circulate a cleaning material through the sampling device. Such a circuit is disclosed in my previously mentioned copending United States patent application.

The pump 15 is necessary to maintain at least a minimum flow rate through the confined zone, which, in conjunction with roughened test section 17, creates complete turbulent flow. Any of a number of types of (preferably high-speed) pumps may be used, such as a gear pump or a rotary positive displacement pump. The minimum flow rate will depend on the roughness of the pipe. This rate may be readily determined by calibrating the densitometer with a liquid of known density. Any flow rate above that minimum determined value will produce complete turbulent flow for a given roughened pipe.

Suitable flowmeters can be turbine or piston driven devices adapted to displace a constant volume of fluid through test section 17 rather than the type indicated by flowmeter 16, wherein the flowing fluid activates devices which preferably provide a mechanical or electrical output which is a function of the flow rate. An electrical generator driven by a turbine placed within line 13 would be an example of such a device.

Transducer 18 can be any suitable differential pressure-detecting device—for example, a Bourdon tube within a Bourdon tube—or a type of differential pressure measuring device utilizing a flexible diaphragm positioned between areas open to the high and low pressure sides of section 17. Again, a mechanical or electrical readout is preferred.

The outputs of flowmeter 16 and transducer 18 can be combined as depicted in FIGURE 4 to give a direct density meter reading in meter 24. Thus, the signal representing the pressure drop in conducting wire 23 is fed into DC amplifier 30. This gives a signal equal to $k_2'\Delta P$, referred to hereinbefore. The signal from flowmeter 16 arriving in meter 24 through conducting wire 28 is fed to a squaring circuit 32 to give a signal equivalent to $q^2$. Then the signals from the DC amplifier 30 and the squaring circuit 32 are sent to divider circuit 34 which gives an output 36 equal to $k_2'\Delta P/q^2$ which is equal to the density of the liquid flowing in the lines. This is merely one embodiment of a method of determining a direct density output measurement of which there are others known to those skilled in the art.

FIGURES 2 and 3 depict alternative mechanisms for causing the turbulence necessary for determining density. In FIG. 2, section 17 is provided with a series of indentations 25 projecting into the confined test zone. Baffles 26 are utilized to create turbulence in the embodiment of FIG. 3.

While direct measurement of density of the entire flowing liquid is clearly possible, it will generally be preferable to utilize a continuous sampling device, such as that of FIG. 1, combined with a suitable high-speed pump and a small test section of a particular roughness, constant diameter, and known length. A desired roughness may be achieved by acid etching or sand blasting. A number of alternative embodiments are at once obvious. It is important only that the inside surface of the confined zone 17 is roughened in a manner so that complete turbulence will result when the liquid from the high-speed pump 15 is directed through the zone. Generally, any sort of upstanding projections within the confined zone act to cause the desired turbulence. It is intended that all such embodiments be included within the scope of my invention as claimed.

What is claimed is:

1. An apparatus for determining the density of substantially incompressible liquids comprising (a) a pump connected within the upstream portion of the conduit to force the liquid through a conduit downstream at least at a minimum flow rate, (b) a downstream confined zone within the conduit having upstanding projections spaced along the direction of flow so as to render the flowing liquid completely turbulent at said minimum flow rate, (c) means for measuring the rate of liquid flow of the liquid, (d) means for measuring the pressure drop across the combined zone section (e) substantially imcompressible means for relating the above measurements to determine the density of the liquid.

2. The apparatus of claim 1 wherein the inside surface of the conduit in the confined zone is roughened to produce turbulence.

3. The apparatus of claim 1 wherein the apparatus has inlet means and outlet means for connecting the apparatus to a body of flowing liquid to determine the density of the liquid.

4. An apparatus according to claim 1 for determining the density of liquids comprising means for transmitting a signal representing the density of the liquid to a receiving station.

5. In a method for determining the density of a substantially imcompressible liquid passing through a confined zone, the steps comprising passing said liquid in completely turbulent flow through a confined zone having substantial length in the direction of liquid flow and relating the liquid volume throughput in an interval of time to the pressure drop across the zone to determine the density of the liquid flowing through said zone.

6. In a method according to claim 5 for determining the density of a liquid passing through a confined zone the steps of pumping said liquid in completely turbulent flow through a confined zone of constant dimensions and having substantial length in the direction of liquid flow; measuring both the total liquid volume passing through the zone in an interval of time and the pressure drop across said zone and deriving from said measurements the density of the liquid passing through the confined zone.

7. A continuous method for determining the interface position of different substantially incompressible liquids flowing in a conduit which comprises diverting a portion of the flow in said conduit into a confined test section having substantial length in the direction of liquid flow through a flow conducting line, pumping the diverted flow through the test section in completely turbulent flow, measuring the pressure drop across said test section, and relating the pressure drop to the rate of liquid flow in an interval of time as a determination of changes in density of the liquid flowing past the diversion point.

8. A continuous method according to claim 7 for determining the interface position of different liquids flowing in a confined line, which comprises continuously pumping a portion of the flow from such a line through a flow-conducting passage in a sampling station adjoining such line and returning the said portion to the line after its passage through said station, pumping the diverted flow through a measuring section of the passage in the station of known length and diameter, said measuring section having interior surface, said interior surface having upstanding projections extending a distance along the direction of liquid flow, which provide sufficient obstruction to flow as to produce substantially complete turbulence in said measuring section when said liquid is flowing through said measured section under the conditions at which the density of said liquid is to be determined, simultaneously measuring both the liquid flow rate through the section of known length and the pressure drop across the liquid flow therein and deriving from said measurements a determination of changes in density of the liquid then flowing past the diversion point, and transmitting signals representative of the density determination to a receiving station as obtained.

9. Apparatus for determining the interface position of different substantially incompressible liquids flowing in a pipeline by directing a representative sample of transport liquid flowing past a selected point in a pipeline through a zone of constant diameter and known length, said apparatus comprising a zone being bounded by a conduit having an interior surface, said interior surface having upstanding projections extending a distance along the direction of liquid flow which provide sufficient obstruction to flow as to produce substantially complete turbulence in said zone when said liquid is pumped through said conduit under the conditions at which the density of said liquid is to be determined; means for pumping liquids through said zone; means for measuring both the total liquid passing through said zone and pressure drop across at least a portion of said zone; and means for obtaining from such measurements a determination of density of the liquid passing the selected point in the pipeline.

10. Apparatus according to claim 9 for determining the density of a liquid passing through a confined zone, comprising a confined zone bounded by a conduit having an interior surface and having substantial length in the direction of liquid flow, said conduit having upstanding from its interior surface projections which provide sufficient obstruction to flow as to produce substantially complete turbulence in said zone when said liquid is flowing through said conduit under the conditions at which the density of said liquid is to be determined, said projections being spaced so as to extend a substantial distance along the direction of liquid flow; means for pumping at least a portion of said liquid in turbulent flow through said confined zone; means for measuring the liquid volume throughout in an interval of time; means for measuring the pressure drop across said zone; and means for relating the liquid volume throughout in an interval of time to the pressure drop across said zone to determine the density of the liquid flowing through said zone.

References Cited

UNITED STATES PATENTS

| 2,703,494 | 3/1955 | Carney | 73—30 |
| 2,772,567 | 12/1956 | Boden et al. | 73—231 |
| 3,073,158 | 1/1963 | Knauth | 73—206 |

RICHARD C. QUEISSER, Primary Examiner

J. K. LUNSFORD, Assistant Examiner

U.S. Cl. X.R.

73—205

UNITED STATES PATENT OFFICE
CERTIFICATE OF CORRECTION

Patent No. 3,483,732                    Dated    Dec. 16, 1969

Inventor(s)         W. B. Gogarty

It is certified that error appears in the above-identified patent and that said Letters Patent are hereby corrected as shown below:

| | | |
|---|---|---|
| Col. 1, line 45: | "metthod" | to read --method-- |
| Col. 1, line 58 | "exciting" | to read --exiting-- |
| Col. 6, line 38 | "throughout" | to read --throughput-- |
| Col. 6, line 40 | "throughout" | to read --throughput-- |

SIGNED AND
SEALED
MAY 12 1970

(SEAL)
Attest:

Edward M. Fletcher, Jr.
Attesting Officer

WILLIAM E. SCHUYLER, JR.
Commissioner of Patents